US008874568B2

(12) United States Patent
Stankiewicz et al.

(10) Patent No.: US 8,874,568 B2
(45) Date of Patent: Oct. 28, 2014

(54) SYSTEMS AND METHODS REGARDING KEYWORD EXTRACTION

(76) Inventors: Zofia Stankiewicz, Forest Hills, NY (US); Satoshi Sekine, Scarsdale, NY (US)

( * ) Notice: Subject to any disclaimer, the term of this patent is extended or adjusted under 35 U.S.C. 154(b) by 0 days.

(21) Appl. No.: 13/287,294

(22) Filed: Nov. 2, 2011

(65) Prior Publication Data

US 2012/0117092 A1    May 10, 2012

Related U.S. Application Data

(60) Provisional application No. 61/410,392, filed on Nov. 5, 2010.

(51) Int. Cl.
*G06F 17/30* (2006.01)
*G06F 7/00* (2006.01)

(52) U.S. Cl.
CPC .... *G06F 17/30705* (2013.01); *G06F 17/30663* (2013.01); *G06F 17/30654* (2013.01)
USPC ............. 707/728; 707/748; 707/767

(58) Field of Classification Search
CPC .......... G06F 17/2785; G06F 17/30684; G06F 17/271
See application file for complete search history.

(56) References Cited

U.S. PATENT DOCUMENTS

| | | | | |
|---|---|---|---|---|
| 6,167,368 | A * | 12/2000 | Wacholder | 704/9 |
| 7,139,752 | B2 * | 11/2006 | Broder et al. | 1/1 |
| 7,925,610 | B2 * | 4/2011 | Elbaz et al. | 706/55 |
| 8,135,728 | B2 * | 3/2012 | Yih et al. | 707/765 |
| 8,463,786 | B2 * | 6/2013 | Udupa et al. | 707/737 |
| 2005/0234879 | A1 * | 10/2005 | Zeng et al. | 707/3 |
| 2005/0267871 | A1 * | 12/2005 | Marchisio et al. | 707/3 |
| 2006/0287988 | A1 | 12/2006 | Mason | |
| 2007/0198506 | A1 | 8/2007 | Attaran Rezaei et al. | |
| 2008/0077397 | A1 * | 3/2008 | Shimohata | 704/10 |
| 2008/0098300 | A1 * | 4/2008 | Corrales et al. | 715/243 |
| 2009/0254512 | A1 | 10/2009 | Broder et al. | |
| 2010/0169340 | A1 * | 7/2010 | Kenedy et al. | 707/758 |
| 2010/0185689 | A1 | 7/2010 | Hu et al. | |
| 2010/0281025 | A1 * | 11/2010 | Tsatsou et al. | 707/733 |
| 2012/0278341 | A1 * | 11/2012 | Ogilvy et al. | 707/749 |

OTHER PUBLICATIONS

International Search Report issued on Mar. 8, 2012, that issued in the corresponding Intnational No. PCT/US2011/058899.

* cited by examiner

*Primary Examiner* — Sangwoo Ahn
(74) *Attorney, Agent, or Firm* — Cowan, Liebowitz & Latman, P.C.; Steven D. Underwood

(57) ABSTRACT

One exemplary aspect comprises a computer system comprising: (a) a preprocessing unit that extracts text from a webpage to produce at least a first set of candidate keywords, applies language processing to produce at least a second set of candidate keywords, and combines said first and second sets of candidate keywords into a first candidate pool; (b) a candidate extraction unit that receives data from said preprocessing unit describing at least said first candidate pool and produces a second candidate pool; (c) a feature extraction unit that receives data describing at least said second candidate pool and analyzes said second candidate pool for general features and linguistic features; and (d) a classification unit that receives said data describing at least said second candidate pool and related data from said feature extraction unit, and determines a likelihood of each candidate in said second candidate pool being a primary or secondary keyword.

19 Claims, 2 Drawing Sheets

_US 8,874,568 B2_

SYSTEMS AND METHODS REGARDING KEYWORD EXTRACTION

CROSS-REFERENCE TO RELATED APPLICATIONS

The present application claims the benefit of U.S. Provisional Patent Application No. 61/410,392, filed Nov. 5, 2010. The entire contents of the above-listed application are incorporated by reference in their entirety into the present disclosure.

INTRODUCTION

Keyword extraction typically serves as the core component of contextual advertising systems, where advertisements that match webpage content are chosen based on keywords automatically selected from the page text. In order to display ads relevant to the webpage, and thus potentially more interesting to the user, numerous features present in the text need to be assessed to make a decision as to which keywords accurately reflect the content of the page.

In an exemplary embodiment described herein, a keyword extraction system takes a page url as input and returns 10 keyword phrases ranked by the system as top keyword candidates. The system first processes webpage text and uses its structure to extract phrases which serve as a keyword candidate pool. Each phrase can then be described by a set of features such as its frequency on the webpage, location in the text, capitalization and its linguistic structure (for example, whether it constitutes a noun phrase). Based on a collection of sample webpages with human-annotated keywords, the system learns how these features contribute to the decision whether a candidate phrase is likely to be a "good" keyword. Once it has been trained in this manner, the system can be used to identify keywords on previously unseen webpages (i.e., that were not in the training set).

The majority of existing keyword extraction systems rely on information retrieval models that employ statistical frequency measures such as tf-idf.[1] An exemplary system embodiment improves this approach by using natural language processing techniques in order to achieve improved performance. One or more exemplary embodiments employ a novel keyword candidate extraction method that is sensitive to phrase structure, and may include additional linguistic features that lead to better machine learning results.

[1] The tf-idf weight (term frequency-inverse document frequency) is a weight often used in information retrieval and text mining. This weight is a statistical measure used to evaluate how important a word is to a document in a collection or corpus. The importance increases proportionally to the number of times a word appears in the document but is offset by the frequency of the word in the corpus.

One exemplary aspect comprises a computer system comprising: (a) a preprocessing unit that extracts text from a webpage to produce at least a first set of candidate keywords, applies language processing to produce at least a second set of candidate keywords, and combines said first and second sets of candidate keywords into a first candidate pool; (b) a candidate extraction unit that receives data from said preprocessing unit describing at least said first candidate pool and produces a second candidate pool; (c) a feature extraction unit that receives data describing at least said second candidate pool and analyzes said second candidate pool for general features and linguistic features; and (d) a classification unit that receives said data describing at least said second candidate pool and related data from said feature extraction unit, and determines a likelihood of each candidate in said second candidate pool being a primary or secondary keyword.

In one or more exemplary embodiments, and combinations thereof: (1) at least part of said language processing is performed by a tokenizer and a parser; (2) at least part of said language processing is performed by a tokenizer, a parser, a part of speech tagger, and a named entity tagger; (3) at least part of said language processing is performed by a tokenizer; (4) at least part of said language processing is performed by a parser; (5) at least part of said language processing is performed by a part of speech tagger; (6) at least part of said language processing is performed by a named entity tagger; (7) said first set of candidate keywords comprises metadata text; (8) said second candidate pool comprises noun phrases and noun sequences; (9) said second candidate pool comprises noun phrases, noun sequences, and n-grams; (10) said general features comprise one or more of frequency, position in the document, and capitalization; (11) said linguistic features relate to one or more of part of speech, phrase structure, and named entity information; (12) said general features comprise frequency features, and said frequency features comprise one or more of relative term frequency within said webpage and log of term frequency; (13) said determination of likelihood of each candidate being a primary or secondary keyword is based on annotated training data; (14) said determination of likelihood of each candidate being a primary or secondary keyword is based on training data created by combining annotation input from multiple annotators, and wherein each annotation includes a distinction between primary and secondary keywords; (15) said general features comprise frequency, position in the document, and capitalization, and said linguistic features relate to part of speech, phrase structure, and named entity information; and/or (16) said general features comprise frequency features, said frequency features comprise one or more of relative term frequency within said webpage and log of term frequency, and said linguistic features relate to part of speech, phrase structure, and named entity information.

Another aspect comprises A method comprising steps implemented by a computer processing system, said steps comprising: (a) extracting text from a webpage to produce at least a first set of candidate keywords, applying language processing to produce at least a second set of candidate keywords, and combining said first and second sets of candidate keywords into a first candidate pool; (b) receiving data describing at least said first candidate pool and producing a second candidate pool; (c) receiving data describing at least said second candidate pool and analyzing said second candidate pool for general features and linguistic features; and (d) receiving said data describing at least said second candidate pool and related data from said feature extraction unit, and determining a likelihood of each candidate in said second candidate pool being a primary or secondary keyword.

Another aspect comprises a tangible computer readable medium storing software operable to perform steps comprising: (a) extracting text from a webpage to produce at least a first set of candidate keywords, applying language processing to produce at least a second set of candidate keywords, and combining said first and second sets of candidate keywords into a first candidate pool; (b) receiving data describing at least said first candidate pool and producing a second candidate pool; (c) receiving data describing at least said second candidate pool and analyzing said second candidate pool for general features and linguistic features; and (d) receiving said data describing at least said second candidate pool and related data from said feature extraction unit, and determining a likelihood of each candidate in said second candidate pool being a primary or secondary keyword.

DETAILED DESCRIPTION OF SELECTED EXEMPLARY EMBODIMENTS

Figure 1:
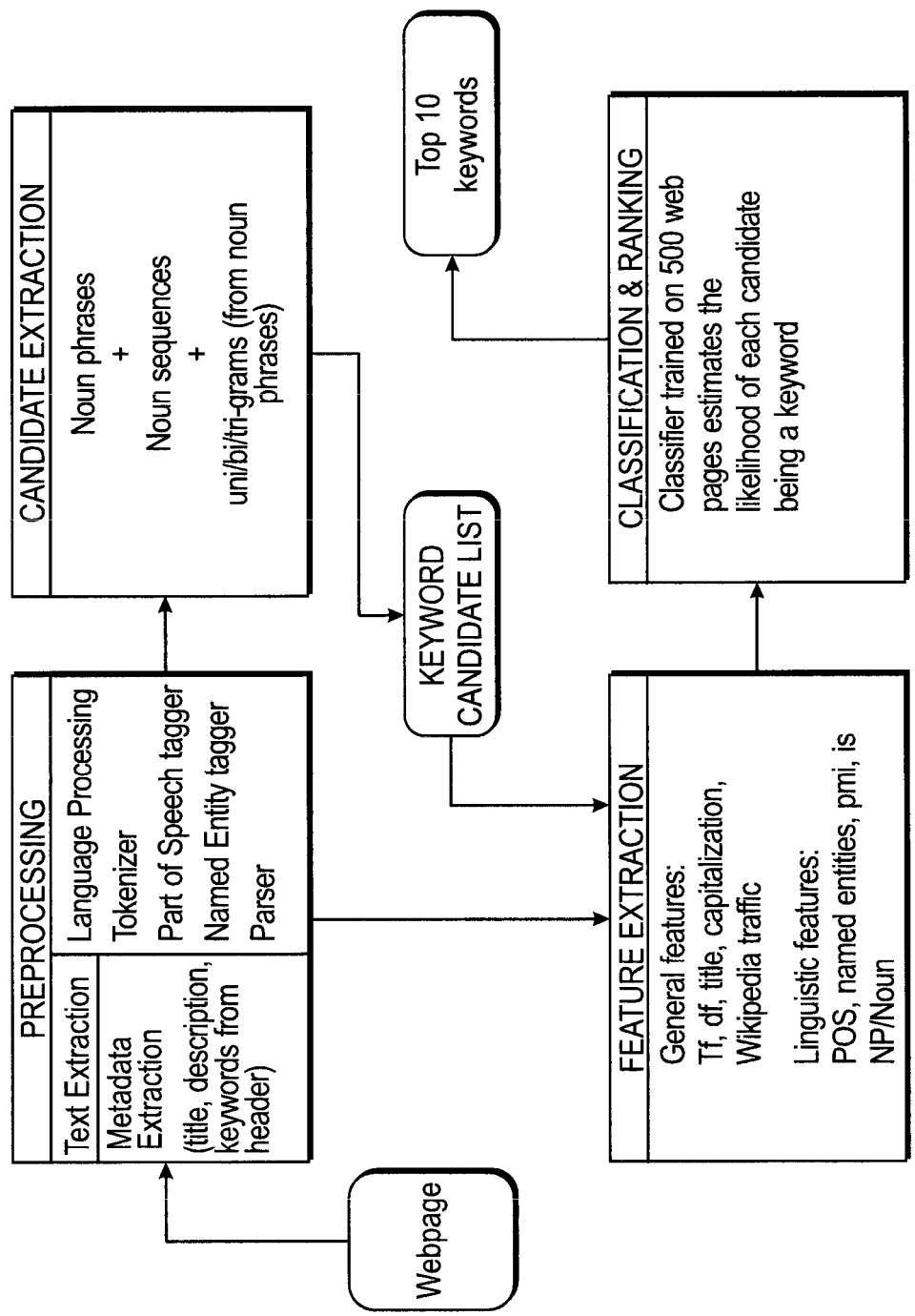
FIG. 1 depicts an overview of processing of an exemplary embodiment.

An overview of an exemplary computer-implemented embodiment is shown in FIG. 1. Each component is described in further detail in the remaining sections of this description.

Exemplary Preprocessing Unit

In an exemplary embodiment, before potential keyword phrases can be selected from the page, plain text of the page may be extracted from the HTML format. In turn, this text may be processed further to obtain information about its structure that can be useful to the keyword extraction system. The preprocessing unit of the system preferably performs extraction as well as tagging and formatting webpage text, to provide suitable input for the stages of candidate phrase selection and feature extraction that follow.

At the preprocessing stage, content text may be first extracted from the webpage using BoilerPipe (see, e.g., [9]), which removes boilerplate content and preserves only the main text body of the page. Aside from the body text, header information such as title, meta-description, and meta-keywords may be extracted and combined with BoilerPipe output to form plain text input for further processing.

The page text may then be tokenized and the tokenizer output passed to a part-of-speech tagger (see, e.g., [18]) and a parser (see, e.g., [13]). Since there is a tendency for keywords to constitute noun phrases, parser output may be used to find noun phrases in the text. The use of a parser rather than a chunker may be motivated by the desire to obtain finer-grained information on hierarchical phrase structure, as opposed to basic noun phrase chunks, in order to improve keyword candidate extraction.

Since Named Entities ("NE") such as person or organization names may be useful keywords, named entities may also be extracted from webpage text. Two different NE systems (see, e.g., [18], [4]) preferably are used in order to provide coverage of a larger set of entity types.

Exemplary Candidate Extraction Unit

Candidate extraction may be used to select phrases that are potential keywords and can be used as input for the classifier which estimates the likelihood that a given phrase is a keyword. In addition, during an exemplary classifier training phrase, better accuracy of candidate extraction helps to filter word combinations that are not likely keywords and thus reduces the amount of negative training samples, thereby improving the ratio of positive to negative training data (the keyword extraction task has an imbalance between positive and negative samples, with very few positive label data).

In an exemplary embodiment, a keyword extraction method performs as follows. First, a base candidate set is formed by recursively extracting all noun phrases from parsed text. Then all candidate subsequences (extracted left to right) that consist of nouns only are added to the candidate set (for example, if best Nixon camera accessories is the candidate, Nixon camera accessories, camera accessories and accessories would be added to the candidate set). Finally, the candidate set is augmented with all unigrams, bigrams, and trigrams extracted from the candidate phrases.

The candidate set may also be filtered against a stoplist of most frequent English words. Unigrams or bigrams containing a stopword preferably are removed from the candidate set. However, longer phrases containing a word from the stoplist in the middle of the phrase may be retained.

Exemplary Keyword Classification Unit

In order to identify which candidate phrases are keywords, an exemplary embodiment employs a classifier that uses the input (features of the candidate phrase) to estimate the probability that the phrase is a keyword, and assigns an output label (keyword or non-keyword) to the phrase. The classifier function that maps the feature input to a keyword label may be obtained using supervised machine learning. That is, the mapping may be learned by the classifier system based on a dataset where "correct" output labels have been provided by human annotators.

To train a classifier for an exemplary system, a maximum entropy (ME) model may be used (this is sometimes called a the logistic regression model; for an introduction, see [11]). An ME model derives constraints from the training data and assumes a distribution of maximum entropy in cases not covered by the training set. The ME classifier input consists of vectors of values for each keyword candidate, which are used by the model to learn the weights associated with each feature. Given new input data, the trained classifier can then compute the probability that a phrase is a keyword given the input values for that candidate phrase.

The probability of a label c given input values $\vec{x}$ may be calculated according to the following formula:

$$P(c\mid\vec{x}) = \frac{\exp\left(\sum_i \alpha_i f_i(\vec{x}, c)\right)}{1 + \exp\left(\sum_i \alpha_i f_i(\vec{x}, c)\right)}$$

where f is a joint-feature (a function of the input vector and the label) and α is a weight assigned to that feature.

To train the maximum entropy classifer one may use a Python library provided in the Natural Language Toolkit (NLTK; see [1]). CG[2] may be used as the training method. However, since the algorithm converges on a unique solution, the choice of training method does not have an effect on classifier performance, and those skilled in the art will recognize that other training methods could be used without departing from the scope of the invention described herein. For example, other learning methods such as support-vector machines (rbf kernel) (see [8]) may be used, but no improvement over the results obtained using the ME model has been found by the present inventors.

[2] CG refers to the Conjugate Gradient method, a standard iterative method to solve sparse linear equation systems that is provided as one of the training methods in the classifier library. CG requires the scipy package (http://www.scipy.org/) to be installed with Python and NLTK.

Due to imbalance of positive and negative training data (i.e., the majority of candidate phrases in the training data are typically not keywords), one may choose not to use the labels (keyword or non-keyword) assigned by the classifier, but instead rank the candidates based directly on the probability scores, choosing, for example the 10 candidates with the highest probabilities in a given webpage.

Exemplary Features

A set of feature values may be computed for each keyword candidate and used as classifier input. The choice of features plays an important role in classifier performance. The features may be divided into two types: (a) general, non-linguistic features, and (b) linguistic features. General features may be similar to the features employed by the system described in [17] and include information such as frequency, position in the document, and capitalization. Linguistic features make use of part of speech, phrase structure, and named entity information. The two types of features are described in more detail below.

TABLE 1

Exemplary Classification Features

| Feature Name | Definition | Type | Used in [17] |
|---|---|---|---|
| TF | No of times keyword candidate appears in the document/total no of candidates in document. | real-valued | YES |
| TFLog | Log(TF + 1) | real-valued | YES |
| DF | Relative frequency of the keyword candidate based on Google Ngram corpus unigram and bigram data. If a candidate phrase is more than 2 words long, average frequency of all bigrams in the candidate phrase is used. | real-valued | YES(based on different doc collection) |
| DFLog | Log(DF + 1) | real-valued | YES |
| Title | 1 if keyword candidate is in Title of the document, 0 otherwise. | binary | YES |
| IsCap | 1 if all words in keyword candidate are capitalized, 0 otherwise. | binary | YES |
| HasCap | 1 if at least one word in keyword candidate is capitalized, 0 otherwise. | binary | YES |
| Location | Relative position of the first occurrence of keyword candidate within the document, according to total no of words in document. | real-valued | YES |
| LocationLog | Log(Location) | real-valued | YES |
| Length | Number of words in keyword candidate. | real-valued | YES |
| Url | 1 if keyword candidate is included in the url of document, 0 otherwise. | binary | YES |
| IsNoun | 1 if all words in keyword candidate are nouns, 0 otherwise. | binary | YES(but defined differently with a distinction between proper an generic nouns) |
| hasNoun | 1 if at least one word in keyword candidate is a noun, 0 otherwise. | binary | YES |
| isNP | 1 if keyword candidate is a noun phrase, 0 otherwise.. | binary | YES |
| hasNP | 1 if keyword candidate contains a noun phrase, 0 otherwise.. | binary | NO |
| POS sequence | Sequence of part of speech tags of the keyword candidate | real-valued | NO |
| IsNE_oak | 1 if keyword candidate is a named entity found by the OAK system, 0 otherwise. | binary | NO |
| HasNE_oak | 1 if keyword candidate contains a named entity found by the OAK system, 0 otherwise. | binary | NO |
| TagNE_oak | NE tag assigned to the keyword candidate by the OAK system. | real-valued | NO |
| IsNE_Stanford | 1 if keyword candidate is a named entity found by the Stanford NER system, 0 otherwise. | binary | NO |
| HasNE_Stanford | 1 if keyword candidate contains a named entity found by the Stanford NER system, 0 otherwise. | binary | NO |
| TagNE_Stanford | Tag assigned to the keyword candidate by the Stanford NER system. | real-valued | NO |
| Pmi | Pointwise mutual information | real-valued | NO |

TABLE 1-continued

Exemplary Classification Features

| Feature Name | Definition | Type | Used in [17] |
|---|---|---|---|
| | score of the candidate phrase. | | |
| Iswiki | 1 if keyword candidate is a wiki title, 0 otherwise. | binary | NO(but similar to search query features used in [14] and [17]) |
| WikiFreq | Wikipedia traffic frequency if keyword is a wiki title, 0 otherwise. | real-valued | NO(but similar to search query features used in [14] and [17] |

Exemplary General Features

Exemplary Frequency Features

Frequency features provide information similar to TFxIDF[3]. Frequency features may include relative term frequency within the document, log of term frequency, as well as DF (frequency in document collection) and log DF values. DF values may be approximated using frequencies from Google Ngram corpus. Preferably only unigram and bigram frequency information are used to calculate DF. For candidate phrases longer than 2 words, the average of DFs for all bigrams in the phrase may be used as the DF value. Averages may be used in order to obtain a similar range of values for phrases of different length. Also, DF values computed for the entire blog collection may be used, instead of the frequencies from the Google Ngram corpus.

[3]TFxIDF refers to term frequency-inverse document frequency and is a standard score used in information retrieval to evaluate the relative importance of a term. It is based on frequency of the term in a given document offset by its overall frequency in collection of documents. The standard formulas for tf and idf are $$tf_{i,j} = \frac{n_{i,j}}{\sum_k n_{k,j}}$$

where $n_{i,j}$ is the number of occurrences of the considered term i in document j, and $$idf_i = \log\frac{|D|}{|d : t_i \in d|}$$

which is the log of a number of all documents in the collection divided by the number of documents that contain the term i.

2. Title

Whether the candidate phrase is in the Title of the document.

3. Capitalization

Capitalized words include proper names or words marked as important terms in a given document. Exemplary capitalization features are: whether all words in keyword candidate are capitalized, and whether at least one word in a candidate phrase is capitalized.

4. Location

Relative position of the first occurrence of the keyword candidate within the document, counting by the number of words. For example, if the document has 20 words and the first word of the candidate phrase is the 5th word in the document, location=5/20=0.25.

5. Length

Number of words in the candidate phrase.

6. URL

Whether the candidate phrase is in the page url.

7. Wiki-traffic

Features based on wikipedia traffic statistics may be used to reflect the popularity of keyword candidates as frequent search/query items. This set of features may include: whether the candidate phrase is a wikipedia title (including redirects), and the traffic figure for the candidate phrase (0 if the candidate is not a wikipedia title). Traffic statistics may be based on hourly wikipedia logs aggregated over a certain period (e.g., a 20 day period in June 2010).

Exemplary Linguistic Features

1. Noun Phrases

Whether the candidate is a Noun Phrase or contains a Noun Phrase.

2. Nouns

Whether the candidate phrase contains at least one noun, and whether the candidate phrase consists of nouns only.

3. POS tags

Sequence of Part of Speech tags assigned to the candidate phrase.

4. Named Entities

Whether a keyword candidate is a Named Entity, whether it contains a Named Entity and the Named Entity tag assigned to the candidate ("O" if the candidate phrase is not an NE).

5. PMI

Pointwise mutual information (PMI) reflects whether a phrase is likely to be a collocation. A PMI score of a candidate phrase may be calculated as follows:

For bigrams, $$PMI(w_1, w_2) = \log\frac{(P(w_1, w_2)}{P(w_1) * P(w_2)},$$

where P(w) is the relative frequency of a word or phrase.

For single words, $$PMI = \log\frac{1}{P(w)}.$$

For candidate phrases longer than 2 words, PMI may be set to the average of PMI scores for all bigrams in the phrase.

Exemplary Evaluation and Data

Exemplary Training Data

The training data may comprise, say, 500 web pages (selected randomly from a blog page corpus; see [3]). Annotators may be presented with plain-text extracted from the blog page and instructed to select keywords that best express the content of the page. Meta information from the header preferably is not included in the annotated text. Preferably there is no limit on the number of keywords that may be chosen for a single page. Additional pages may also be annotated and set aside as a test set not used for training.

Inter-Annotator Agreement and Golden Standard

For each page, the keywords preferably are selected by two annotators. However, the inter-annotator agreement on this task is might not be high (for example, in one implementation, the kappa score[4] of annotators was 0.49. Low kappa scores may be due to the following: First, annotators may tag similar phrases that are only partial matches. Second, when a maximum number of keywords that can be selected is not specified, one annotator may choose to select a greater number of keywords than another for a given text.

[4] Cohen's kappa coefficient is a statistical measure commonly employed to measure agreement between annotators on categorical tasks. Kappa is calculated as $$\frac{P(A) - P(E)}{1 - P(E)}$$

where P(A) is the observed agreement among the coders, and P(E) is the probability that the coders agree by chance. A kappa score above 0.6-0.7 is considered "substantial agreement."

In order to create a Golden Standard (GS) that is not dependent on a single annotator, output from both annotators may be combined. When annotating a keyword, the annotators may be instructed to also select whether the keyword is a "primary keyword" or a "secondary keyword." Primary keywords may be defined as keywords that capture the main topic or the central ideas of the document. Secondary keywords may be defined as important phrases that provide additional key information about the document (for example, the location where the event took place, additional but important figures that were mentioned, etc.). To create a keyword set that accurately reflects the choices of both annotators, one may retain the following keywords in the GS:

1. All keywords that have been marked as primary (by one annotator or both).
2. Secondary keywords that were selected by both annotators.
3. Secondary keywords that were selected by only one person but that were partial matches to primary keywords selected by the other annotator.

In an exemplary embodiment using the GS, kappa scores between each annotator and the standard were 0.75 for annotator 1 and 0.74 for annotator 2. Detailed agreement statistics for primary and secondary keywords are shown in Table 2 below.

TABLE 2

| Annotator 1/ Annotator 2 | Primary | Secondary | Not a keyword |
|---|---|---|---|
| Primary | 1652 | 319 | 1796 |
| Secondary | 437 | 264 | 1777 |
| Not a keyword | 1069 | 264 | ///////// |

Exemplary Candidate Extraction Unit

As discussed above, an exemplary embodiment uses noun phrases as a base candidate set, but augments the candidate pool with noun sequences and unigrams, bigrams, and trigrams extracted from the noun phrases.

One prior art method of obtaining all possible candidate phrases from a text is to include all n-grams up to length n (typically 3-5) in the candidate set. A serious disadvantage of this n-gram method is that it introduces substantial noise, in the form of word sequences that are not meaningful phrases and/or are not likely to be potential keywords. The n-gram method thus suffers from low precision.

An alternative prior art method is to use language structure cues to extract candidates. Since keywords tend to be noun phrases, all noun phrases from the text can be used to form the candidate pool. However, this method has a markedly lower recall than the n-gram extraction method, which means that many potential keywords are not included in the candidate set.

Precision, recall, and F-measure of the n-gram and the noun phrase strategies have been compared by the present inventors with an extraction method of an exemplary embodiment. In other words, the present inventors have evaluated how effective each approach would be if it were used as the only method to select keywords, without a further classification stage. The results are summarized in Table 3 below.

TABLE 3

Comparison of Candidate Extraction Methods

| Method | Total | Key not in Cand | Key in Cand | Precision | Recall % | Fscore |
|---|---|---|---|---|---|---|
| N-gram | 365,779 | 786 | 4839 | 1.3 | 85.9 | 2.6 |
| Noun Phrases | 14,441 | 4160 | 1465 | 10.4 | 26 | 14.6 |
| Exemplary embodiment | 85,059 | 1008 | 4617 | 5.4 | 81.95 | 10.2 |

As shown in Table 3, the n-gram approach has a recall above 80%, but it also has the lowest precision of the three methods (i.e., the candidate set includes a substantial amount of noise). Extracting noun phrases as candidates has the advantage of increasing precision, but this method has a very low recall (only 26%), so there is a high chance of missing potential keywords.

In contrast, an exemplary embodiment of the inventive method results in an improvement in recall compared to extracting noun phrases. The recall of this approach is comparable to the n-gram method, but the precision is higher. Evaluation results of how the different methods combine with classifier performance are described below.

Classifier Performance

To assess overall system performance, the results achieved by the inventive system were compared to a baseline, based on [17]. In the baseline system, the candidate extraction method is the n-gram method, and features consist of general non-linguistic features (plus a simple set of NP/Noun features). How system performance changed with (a) the use of the combined candidate extraction method, and (b) the addition of linguistic features at the classification stage, was analyzed.

In comparing the inventive system against the baseline, two evaluation measures were used:

1. R-Precision (how many candidates out of top-n results are keywords, where n is the total no of possible keywords on page).

2. Top-10 score (like R-Precision but with a cut-off at top-10 results, i.e. all n>10 are set to 10).

The top-10 measure was used for evaluation since it provides an estimate of how the classifier performs as an extraction system when the candidates with top-10 scores are selected as the keyword output. System performance was tested on a held-out test set of 100 webpages which were never used in classifier training (see Table 4) and cross-validation testing was conducted on a 500 page training set (10 folds of approximately 50 documents each; see Table 5).

TABLE 4

Top-10 score results for the held-out set.

| Method | General Features | General + Linguistic Features |
|---|---|---|
| Ngrams | 43.71 | 47.24 |
| Inventive | 48.28 | 49.84 |

TABLE 5

Top-10 score results for cross-validation tests.

| Method | General Features | General + Linguistic Features |
|---|---|---|
| Ngrams | 45.97 | 49.01 |
| Inventive | 48.21 | 51.74 |

The difference in results between the baseline and the inventive system is statistically significant (according to a two-tailed paired t-test on cross-validation results, p=0.0001). The relative improvement over the baseline is 12.55%.

RELATED EMBODIMENTS

There are two preferred approaches to selecting contextually appropriate advertisements for a given webpage. One approach involves direct matching of webpage text to the advertisement pool. In the other approach, the match between the page and the ad involves an intermediate keyword extraction step. Examples of each approach are given below.

Keyword Extraction
1. KEA [5]
2. GenEx [15], [14]
3. Yih et. al. [17]
4. Hulth [7], [6]
5. Other: [10], [16]

Contextual Advertising
1. Broder et. al. [2]
2. Ribeiro-Neto et. al. [12].

In certain exemplary system and method embodiments described herein, keyword extraction preferably comprises: (a) preprocessing, which includes text extraction from the webpage as well as linguistic processing such as part of speech tagging and parsing; (b) extraction of keyword candidate phrases; and (c) candidate classification using supervised machine learning.

The inventive systems and methods may achieve improved performance due to use of linguistic information, both at the candidate selection and at the feature extraction stage. An exemplary embodiment comprises candidate selection that uses hierarchical phrase structure, resulting in a less noisy candidate pool. Features that may be used for classification also include linguistic features such as part of speech and named entity information, resulting in improved classifier performance.

Embodiments comprise computer components and computer-implemented steps that will be apparent to those skilled in the art. For example, calculations and communications can be performed electronically, and results can be displayed using a graphical user interface.

Figure 2:
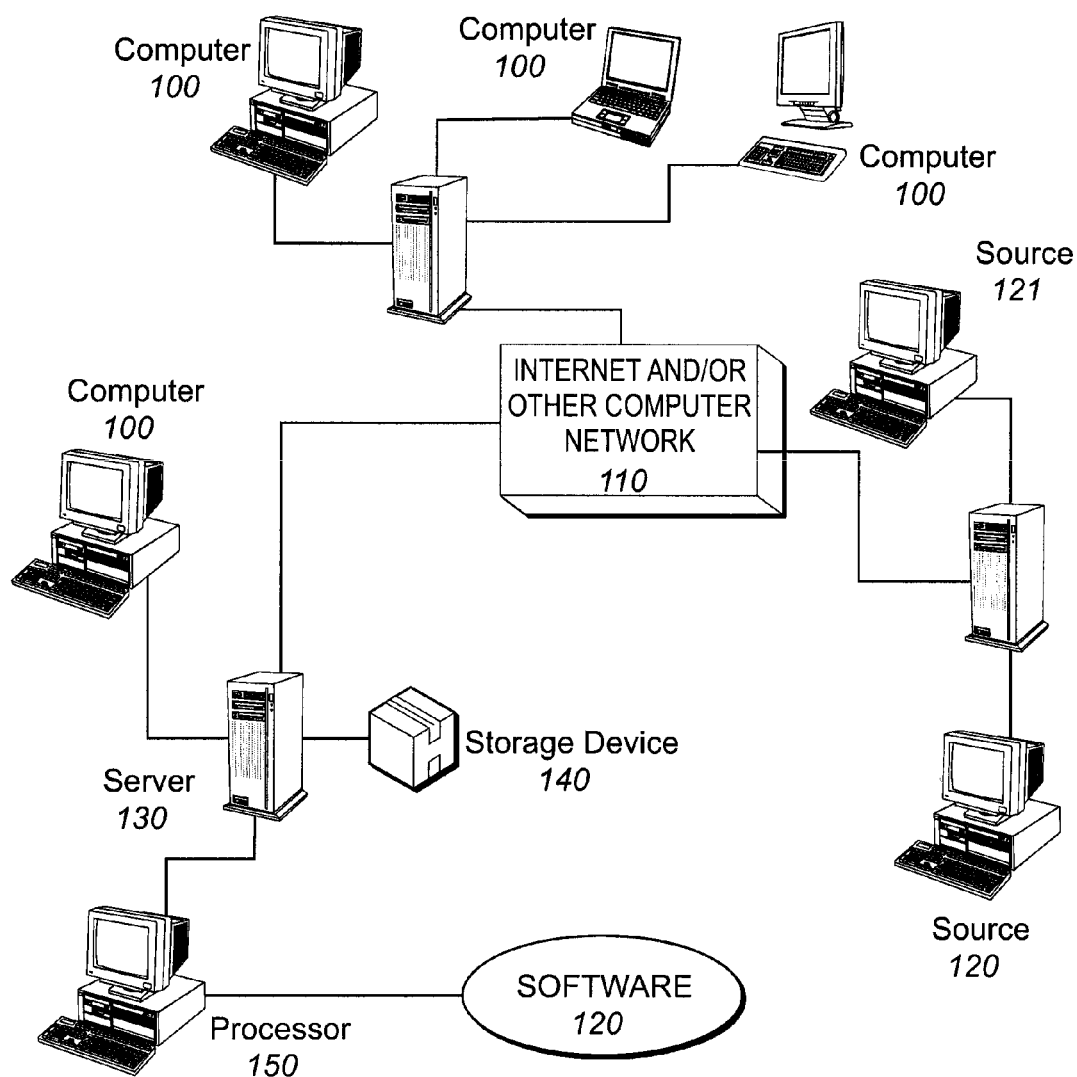
FIG. 2 depicts a computer system over which an exemplary embodiment may be implemented.

An exemplary such system is depicted in FIG. 2. Computers 100 communicate via network 110 with a server 130. A plurality of sources of data 120-121 also communicate via network 110 with a server 130, processor 150, and/or other components operable to calculate and/or transmit information. Server(s) 130 may be coupled to one Or more storage devices 140, one or more processors 150, and software 160.

Calculations described herein, and equivalents, are, in an embodiment, performed entirely electronically. Other components and combinations of components may also be used to support processing data or other calculations described herein as will be evident to one of skill in the art. Server 130 may facilitate communication of data from a storage device 140 to and from processor(s) 150, and communications to computers 100. Processor 150 may optionally include or communicate with local or networked storage (not shown) which may be used to store temporary or other information. Software 160 can be installed locally at a computer 100, processor 150 and/or centrally supported for facilitating calculations and applications.

For ease of exposition, not every step or element of the present invention is described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

Moreover, where a computer system is described or claimed as having a processor for performing a particular function, it will be understood by those skilled in the art that such usage should not be interpreted to exclude systems where a single processor, for example, performs some or all of the tasks delegated to the various processors. That is, any combination of, or all of, the processors specified in the description and/or claims could be the same processor. All such combinations are within the scope of the invention.

Alternatively, or in combination, processing and decision-making may be performed by functionally equivalent circuits such as a digital signal processor circuit or an application specific integrated circuit.

Many routine program elements, such as initialization of loops and variables and the use of temporary variables, are not described herein. Moreover, it will be appreciated by those of ordinary skill in the art that unless otherwise indicated, the particular sequence of steps described is illustrative only and can generally be varied without departing from the scope of the invention. Unless otherwise stated, the processes described herein are unordered—that is, the processes can be performed in any reasonable order.

All steps described herein will be understood by those skilled in the art as being capable of implementation by software, where feasible. Moreover, such software will be understood by those skilled in the art to be storable on a non-transitory computer readable medium and implementable by one or more computer processors.

While this invention has been described in conjunction with the exemplary aspects embodiments outlined herein, many alternatives, modifications, and variations will be apparent to those skilled in the art. Accordingly, exemplary aspects and embodiments of the invention, as set forth herein, are intended to be illustrative, not limiting. Various changes may be made without departing from the spirit and scope of the invention.

REFERENCES

[1] Bird, Steven, Edward Loper and Ewan Klein. *Natural Language Processing with Python*. O'Reilly Media Inc., 2009.

[2] Broder, Andrei and Fontoura, Marcus and Josifovski, Vanja and Riedel, Lance. A semantic approach to contextual advertising. *SIGIR '07: Proceedings of the 30th annual international ACM SIGIR conference on Research and development in information retrieval*, pages 559-566, New York, N.Y., USA, 2007. ACM.

[3] Kevin Burton and Akshay Java and Ian Soboroff. The ICWSM 2009 Spinn3r Dataset. San Jose, Calif., 2009.

[4] Finkel, Jenny Rose and Grenager, Trond and Manning, Christopher. Incorporating non-local information into information extraction systems by Gibbs sampling. *ACL '05: Proceedings of the 43rd Annual Meeting on Association for Computational Linguistics*, pages 363-370, Morristown, N.J., USA, 2005. Association for Computational Linguistics.

[5] Frank, Eibe and Paynter, Gordon W. and Witten, Ian H. and Gutwin, Carl and Nevill-Manning, Craig G. Domain-specific keyphrase extraction. *IJCAI '99: Proceedings of the 16th international joint conference on Artificial intelligence*, pages 668-673, San Francisco, Calif., USA, 1999. Morgan Kaufmann Publishers Inc.

[6] Hulth, Anette. *Automatic Keyword Extraction. Combining Machine Learning and Natural Language Processing*. Verlag Dr. Muller, 2008.

[7] Hulth, Anette. Improved automatic keyword extraction given more linguistic knowledge. *Proceedings of the 2003 conference on Empirical methods in natural language processing*, pages 216-223, Morristown, N.J., USA, 2003. Association for Computational Linguistics.

[8] Joachims, Thorsten. Making large-scale support vector machine learning practical.:169-184, 1999.

[9] Kohlschëtter, Christian and Fankhauser, Peter and Nejdl, Wolfgang. Boilerplate detection using shallow text features. *WSDM '10: Proceedings of the third ACM international conference on Web search and data mining*, pages 441-450, New York, N.Y., USA, 2010. ACM.

[10] Matsuo, Y. and Ishizuka, M. Keyword Extraction from a Document using Word Co-occurrence Statistical Information. *Transactions of the Japanese Society for Artificial Intelligence*, 17:217-223, 2002.

[11] Adwait Ratnaparkhi. A Simple Introduction to Maximum Entropy Models for Natural Language Processing. Technical report, IRCS, 1997.

[12] Ribeiro-Neto, Berthier and Cristo, Marco and Golgher, Paulo B. and Silva de Moura, Edleno. Impedance coupling in content-targeted advertising. *SIGIR '05: Proceedings of the 28th annual international ACM SIGIR conference on Research and development in information retrieval*, pages 496-503, New York, N.Y., USA, 2005. ACM.

[13] Sekine, Satoshi and Ralph Grishman. A corpus based probabilistic grammar with only two non-terminals. *Fourth International Workshop on Parsing Technology*, 1995.

[14] Turney, Peter D. Coherent keyphrase extraction via web mining. *IJCAI '03: Proceedings of the 18th international joint conference on Artificial intelligence*, pages 434-439, San Francisco, Calif., USA, 2003. Morgan Kaufmann Publishers Inc.

[15] Turney, Peter D. Learning Algorithms for Keyphrase Extraction. *Inf. Retr.*, 2(4):303-336, 2000.

[16] Wu, Xiaoyuan and Bolivar, Alvaro. Keyword extraction for contextual advertisement. *WWW '08: Proceeding of the 17th international conference on World Wide Web*, pages 1195-1196, New York, N.Y., USA, 2008. ACM.

[17] Yih, Wen-tau and Goodman, Joshua and Carvalho, Vitor R. Finding advertising keywords on web pages. *WWW '06: Proceedings of the 15th international conference on World Wide Web*, pages 213-222, New York, N.Y., USA, 2006. ACM.

[18] OAK System. http://nlp.cs.nyu.edu/oak/.

We claim:

1. A computer system comprising one or more processors that function as:
   (a) a preprocessing unit that extracts text from a webpage to produce at least a first set of candidate keywords, applies language processing to produce at least a second set of candidate keywords, and combines said first and second sets of candidate keywords into a first candidate pool;
   (b) a candidate extraction unit that receives data from said preprocessing unit describing at least said first candidate pool and produces a second candidate pool;
   (c) a feature extraction unit that receives data describing at least said second candidate pool and analyzes said second candidate pool for general features and linguistic features, wherein said general features include number of times a term appears in the text extracted from the webpage; and
   (d) a classification unit that receives said data describing at least said second candidate pool and related data from said feature extraction unit, and determines a likelihood of each candidate in said second candidate pool being a primary or secondary keyword.

2. A computer system as in claim 1, wherein at least part of said language processing is performed by a tokenizer and a syntax parser.

3. A computer system as in claim 1, wherein at least part of said language processing is performed by a tokenizer, a syntax parser, a part of speech tagger, and a named entity tagger.

4. A computer system as in claim 1, wherein at least part of said language processing is performed by a tokenizer.

5. A computer system as in claim 1, wherein at least part of said language processing is performed by a syntax parser.

6. A computer system as in claim 1, wherein at least part of said language processing is performed by a part of speech tagger.

7. A computer system as in claim 1, wherein at least part of said language processing is performed by a named entity tagger.

8. A computer system as in claim 1, wherein said first set of candidate keywords comprises metadata text.

9. A computer system as in claim 1, wherein said second candidate pool comprises noun phrases and noun sequences.

10. A computer system as in claim 1, wherein said second candidate pool comprises noun phrases, noun sequences, and n-grams.

11. A computer system as in claim 1, wherein said general features comprise one or more of frequency, position in the document, and capitalization.

12. A computer system as in claim 1, wherein said linguistic features relate to one or more of part of speech, phrase structure, and named entity information.

13. A computer system as in claim 1, wherein said general features comprise frequency features, and said frequency features comprise one or more of relative term frequency within said webpage and log of term frequency.

14. A computer system as in claim 1, wherein said determination of likelihood of each candidate being a primary or secondary keyword is based on annotated training data.

15. A computer system as in claim 1, wherein said determination of likelihood of each candidate being a primary or secondary keyword is based on training data created by combining annotation input from multiple annotators, and wherein each annotation includes a distinction between primary and secondary keywords.

16. A computer system as in claim 1, wherein said general features comprise frequency, position in the document, and capitalization, and said linguistic features relate to part of speech, phrase structure, and named entity information.

17. A computer system as in claim 1, wherein said general features comprise frequency features, said frequency features comprise one or more of relative term frequency within said webpage and log of term frequency, and said linguistic features relate to part of speech, phrase structure, and named entity information.

18. A method comprising steps implemented by a computer processing system, said steps comprising:
   (a) extracting text from a webpage to produce at least a first set of candidate keywords, applying language processing to produce at least a second set of candidate keywords, and combining said first and second sets of candidate keywords into a first candidate pool;
   (b) receiving data describing at least said first candidate pool and producing a second candidate pool;
   (c) receiving data describing at least said second candidate pool and analyzing said second candidate pool for general features and linguistic features, wherein said general features include number of times a term appears in the text extracted from the webpage; and
   (d) receiving said data describing at least said second candidate pool and related data from analyzing said second candidate pool, and determining a likelihood of each candidate in said second candidate pool being a primary or secondary keyword.

19. A non-transitory computer readable medium storing software instructions comprising:
   (a) extracting text from a webpage to produce at least a first set of candidate keywords, applying language processing to produce at least a second set of candidate keywords, and combining said first and second sets of candidate keywords into a first candidate pool;
   (b) receiving data describing at least said first candidate pool and producing a second candidate pool;
   (c) receiving data describing at least said second candidate pool and analyzing said second candidate pool for general features and linguistic features, wherein said general features include number of times a term appears in the text extracted from the webpage; and
   (d) receiving said data describing at least said second candidate pool and related data from analyzing said second candidate pool, and determining a likelihood of each candidate in said second candidate pool being a primary or secondary keyword.

* * * * *